United States Patent Office 3,595,655
Patented July 27, 1971

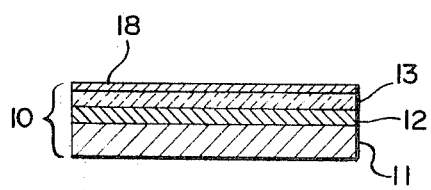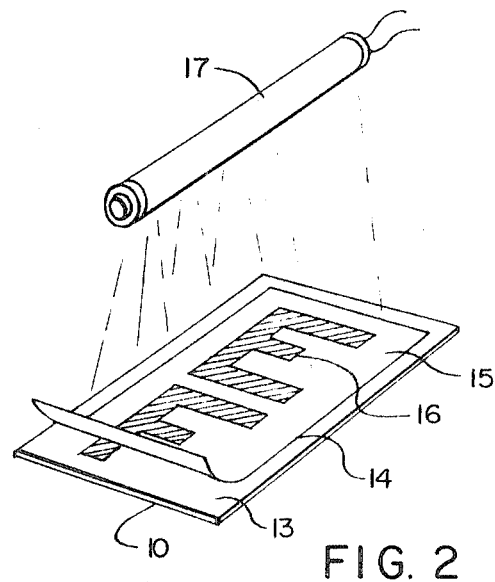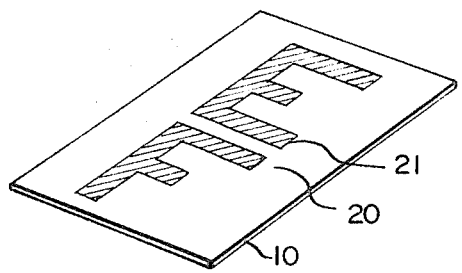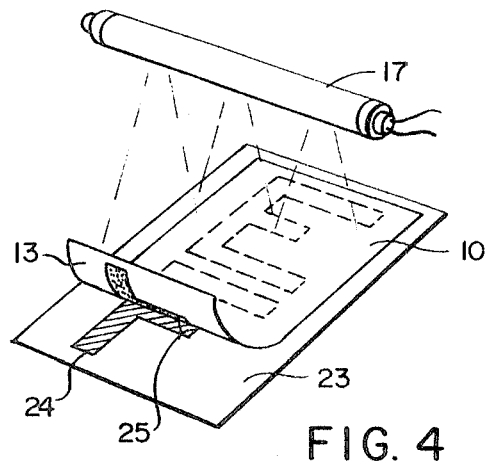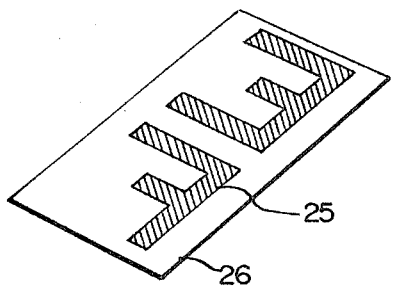

3,595,655
NON-SILVER DIRECT POSITIVE DYES BLEACH-OUT SYSTEM USING POLYMETHINE DYES AND COLORLESS ACTIVATORS
Ian D. Robinson, Auburndale, and Joanne C. Gerlach, Watertown, Mass., assignors to Arthur D. Little, Inc., Cambridge, Mass.
Filed Oct. 3, 1968, Ser. No. 764,661
Int. Cl. G03c 1/72, 5/24
U.S. Cl. 96—48
20 Claims

ABSTRACT OF THE DISCLOSURE

A direct positive, bleach-out photographic system suitable for photography and photocopy work. A polymethine dye and essentially colorless activator, supported in a binder, form the photosensitive system which is bleached out when exposed to a range of electromagnetic radiation extending from X-rays to the visible spectrum. The system is adapted to forming prints and transparencies in black and white, monochrome and full color.

CROSS REFERENCES TO RELATED APPLICATIONS

In four copending applications we have disclosed four other direct positive bleach-out systems. These applications are Ser. No. 764,662 filed Oct. 3, 1968 and directed to a combination of polymethine dyes and colored activators; Ser. No. 767,744 filed Oct. 3, 1968 and directed to a combination of indigoid dyes and essentially colorless activators; Ser. No. 764,766 filed Oct. 3, 1968 and directed to a combination of indigoid dyes and colored activators; and Ser. No. 764,762 filed Oct. 3, 1968 and directed to a combination of stable free radical dyes and essentially colorless activators.

This invention relates to a photographic method and article and more particularly to a direct positive bleach-out photographic system suitable for photography to produce black and white, monochrome and full color prints and transparencies, for photocopying to make black-and-white, monochrome and full color copies, and to processes and articles which involve as at least one step or product the making of a photographic copy.

There is, of course, a large body of prior art concerned with the general fields of photography and photocopying. This body of prior art includes the use of silver halide emulsions with their attendant darkroom processing techniques, the employment of photoconductive particles or films with accompanying formation of electrostatic latent images and subsequent toning and fixing, and the formation of vesicular images in water-insensitive photographic materials. However, since these prior art techniques are completely distinguishable from that of the present invention, they need not be discussed. Rather, the prior art which is pertinent to this invention is set forth in a series of United States Patents (see for example U.S. Pat. 3,102,027; 3,104,973; 3,114,635; 3,154,416 and 3,155,509) describing a so-called "bleach-out" system employing a light-sensitive combination of a dye and an activator. Exposure of these light-sensitive materials effects bleaching of the dyes in those areas exposed to light of a predetermined wavelength range. The unexposed areas remain the color of the original dye, thus forming a contrast which gives rise to a copy or photograph.

Bleach-out systems of this type have certain marked advantages, among which may be listed the absence of graininess, the elimination of darkroom procedures and rapidity of access. However, the prior art systems, although realizing these advantages at least in part, possess certain inherent disadvantages. As activators for the dye systems, the prior art uses an alkyl, aryl, or aralkyl compound having at least three halogen (Cl, Br, or I) atoms attached to a single carbon atom, e.g., $CBr_4$. These activators are highly toxic and noxious to use. Moreover some of the light-sensitive systems of this prior art show a marked tendency to develop color in the bleached areas during use or storage even in the absence of light, thus causing eventual obliteration of the copy. Most of these prior art systems cannot be fixed satisfactorily.

It would, therefore, be desirable to have a positive, bleach-out photographic system which retained all the advantages inherent in such a system and which at the same time is capable of overcoming at least some of the more restrictive disadvantages associated with the prior art systems.

It is therefore a primary object of this invention to provide a light-sensitive, positive bleach-out photographic system which is capable of providing a sharp, positive, grainless copy of rapid access which exhibits improved stability. It is another object of this invention to provide a light-sensitive system of the character described which can be chosen to be non-toxic and to eliminate any noxious or unpleasant aspects in its formulation, application to a substrate, use and developing. It is yet another object to provide such a system which is flexible with respect to the manner in which it may be exposed, to the type of processing to which it is subjected and to the type of final product achieved.

It is another primary object of this invention to provide a method of photography or photocopying which is capable, through the choice of dyes and structure of the light-sensitive system, of producing prints or transparencies in black-and-white, monochrome or full color.

It is another primary object of this invention to provide photosensitive articles of the character described and methods of using them which are simple to formulate and use and which may be relatively inexpensive. Other objects of the invention will in part be obvious and will in part be apparent hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings in which:

FIG. 1 is a cross section of the light-sensitive system of this invention applied to a substrate to form a photosensitive sheet;

FIG. 2 illustrates the step of exposing the photosensitive sheet of FIG. 1 to a transparency for copying by direct contact;

FIG. 3 illustrates the formation of the image made by the exposure illustrated in FIG. 2;

FIG. 4 illustrates the use of the photosensitive article of this invention to make a reverse copy of an opaque original by the reflex technique;

FIG. 5 illustrates the copy made by the exposure illustrated in FIG. 4;

Figure 6:
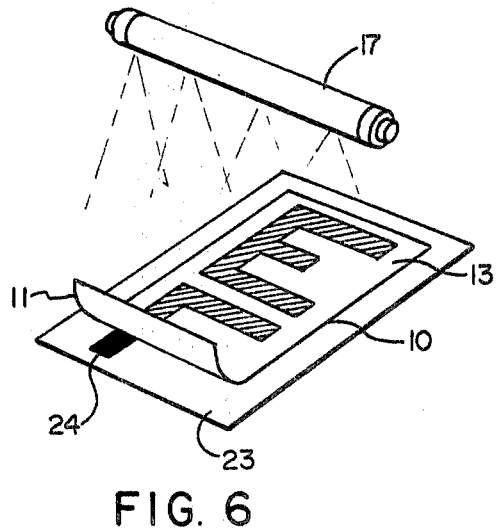
FIG. 6 illustrates the use of the photosensitive article of this invention to make a right-reading copy of an opaque original by the reflex technique.

The photosensitive positive bleach-out system of this invention may be defined as one which comprises a polymethine dye such as a cyanine dye, a merocyanine dye, a styryl dye, an oxonol dye or a combination of such dyes and an activator which is an essentially colorless compound or mixture of compounds which are capable of initiating the photopolymerization of a vinyl monomer. More specifically, these activators are compounds which form free radicals when exposed to a predetermined wavelength range of the electromagnetic spectrum. Although the activator may contain halogens, such halogens are never the sole functional group and the activators are free of the —$CX_3$ grouping in which X is a halogen. The wavelength range of electromagnetic radiation to which the systems of this invention are sensitive includes X-rays, gamma rays, ultraviolet and visible light.

The bleach-out dyes usable in the photosensitive system of this invention may be defined as those which belong to the general group of polymethine dyes, and include as dye classes those normally referred to as cyanine, merocyanine, styryl and oxonol dyes. The term "polymethine" is used hereinafter and in the claims in a broad generic sense and it is meant to include both the methine and polymethine dyes.

These dyes all incorporate in their structure a common grouping which may be represented as $$-\overset{|}{C}(=X-\overset{|}{C})_n = \text{ or } =\overset{|}{C}(-X=\overset{|}{C})_n-$$

wherein X may be CH or N.

In the case of the cyanine dyes this grouping is the amidinium-ion system $$\overset{\diagdown}{\underset{\diagup}{N}}-\overset{|}{C}(=X-\overset{|}{C})_n=\overset{\oplus}{\underset{\diagdown}{N}}\overset{\diagup}{}$$

in the case of the merocyanine dyes this grouping is the amidic-ion system $$\overset{\diagdown}{\underset{+}{N}}=\overset{|}{C}(-X=\overset{|}{C})_n-\overset{..}{\underset{..}{O}}:^{\ominus}$$

and in the case of the oxonol dyes this grouping is the carboxyl-ion system $$:O=\overset{|}{C}(-X=\overset{|}{C})_n-\overset{..}{\underset{..}{O}}:^{\ominus}$$

The cyanine and merocyanine dyes are employed in other than a free base form. These dyes are of diverse types and are known to those skilled in the art of photography to be those capable of optically sensitizing silver halide emulsions.

Generally all subclasses of cyanine dyes are useful so long as they can be bleached in a reasonable time when exposed to the desired wavelength range in the presence of the activators of this invention. The final choice of dye or dye mixture will depend upon the color or colors sought, the performance characteristics desired and the detailed procedures required to be carried out in using them.

The cyanine dyes are derived from quaternary salts of heterocyclic bases by condensation reactions known in the art. Typically, such heterocyclic bases may be chosen from one of the following having an active methyl group:

2-methylbenzothiazole
2-methylbenzoxazole
2-methylbenzimidazole
2-methylthiazoline
1-methylisoquinoline
2-methyl-α-naphthothiazole
2,4-dimethylselenazole
2-methylbenzoselenazole
2,4-dimethyloxazole
2-methyl-α-naphthoxazole
2-methyl-β-naphthoxazole
2-methyl-4,5,6,7-tetrahydrobenzothiazole
2-methyl-4,5,6,7-tetrahydrobenzoxazole
2-methyl-5,6,7,8-tetrahydro-4-cycloheptathiazole
2-methyl-5,6-dihydro-4-cyclopentathiazole
2-methyl-6,7-dihydro-4-H-pyrano(4,3D)thiazole
2-methyl-6,7-dihydro-4-H-thiopyrano(4,3D)thiazole
2-methyl-5,6-dihydro-4-H-pyrano(3,2D)thiazole
2-methyl-β-naphthothiazole
α-picoline
γ-picoline
3-methylisoquinoline
2,4-dimethylthiazole
2-methyl-4-phenylthiazole
2-methylthiazole
2,3,3-trimethylindolenine
α-methylquinoline
γ-methylquinoline The cyanine dyes which result from the condensation of quaternary salts with these heterocyclic bases may be grouped into several general subclasses as follows:

(1) Symmetrical and unsymmetrical cyanines generally represented as $$R-\overset{\diagup Z\diagdown}{N}-(L=L)_{a-1}-\overset{|}{\underset{H}{C}}=\overset{|}{\underset{R'}{C}}-(C=CH)_{b-1}-(CH=CH)_{c-1}-C=(L-L)_{d-1}=\overset{+}{N}-R' \quad X^-$$

wherein:

R, R' and R'' are alkyl, substituted alkyl, aryl, substituted aryl or hydrogen
L is a methine group
X is an acid radical
Z and Z' are nonmetallic atoms required to complete a heterocyclic nucleus containing 5 or 6 atoms in a heterocyclic ring, e.g., thiazole, oxazole, etc.
a, b and d are 1 or 2
c is 1, 2, 3 or 4;

(2) Symmetrical pyrrolocyanines generally represented as $$R''-\overset{\diagup Z\diagdown}{\underset{R}{N}}-\overset{|}{C}=C-(CH)_{2n-1}=C-\overset{|}{\underset{R'}{C}}=\overset{+}{N}-R''' \quad X^-$$

wherein:

R and R' are H, alkyl, or a chemical bond in a pyridine ring
R'' and R''' are H, alkyl, arylalkyl or a chemical bond of the same pyridine ring as R or R'
Z and Z' are nonmetallic atoms necessary to complete a pyrrole, indole or pyrrocoline nucleus
X is an acid radical
n is 1 or 2;

(3) Unsymmetrical pyrrolocyanines generally represented as $$R'-\overset{\diagup Z\diagdown}{N}-(CH=CH)_{a-1}-C=(CH-CH)_{d-1}=C-\overset{\diagup J\diagdown}{\underset{R}{C}}=N^+-R'' \quad X^-$$

wherein:

R is H, alkyl, or a chemical bond in a pyridine ring
R′ is alkyl
R″ is H, alkyl, aryl, or a chemical bond of the same pyridine ring as R
Z are the nonmetallic atoms necessary to complete a 5 or 6 membered heterocyclic nucleus
J are the nonmetallic atoms necessary to complete a pyrrole nucleus
X is an acid radical
$d$ is 2 or 3
$n$ is 1 or 2; and (4) Hemicyanines generally represented as

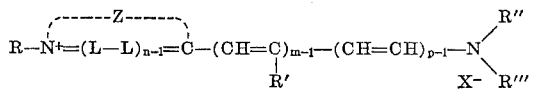

wherein:

R and R′ are H, alkyl, or aralkyl
R″ and R‴ are alkyl, aralkyl, aryl, or a bond in the same heterocyclic ring
L is a methine group
X is an acid radical
Z are the nonmetallic atoms necessary to complete a heterocyclic ring
$m$ and $n$ are 1 or 2
$p$ is 1, 2 or 3.

The styryl dyes and their vinylene homologs may be represented by the general formula

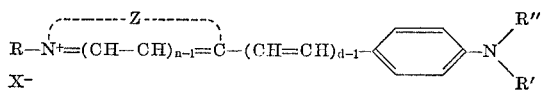

wherein:

R, R′ and R″ are alkyl or aralkyl
Z are the nonmetallic atoms necessary to complete a heterocyclic nucleus containing 5 or 6 atoms in a heterocyclic ring, e.g., thiazole, oxazole, etc.
X is an acid radical
$n$ is 1 or 2
$d$ is 2, 3 or 4.

The third general class of dyes suitable for the practice of this invention are those known in the art as merocyanine dyes; and these are useful in the forms of simple merocyanines, merocarbocyanines, meropolycarbocyanines and the several types of complex merocyanines including rhodocyanines. The merocyanine dyes are derived from quaternary salts of heterocyclic bases (such as those listed above in the description of the cyanine dyes) by condensation reactions with ketomethylene derivatives such as 3-ethyl rhodanine
acetyl acetone
diethyl malonate
3(2H)-thianaphthenone
5-methoxy-3(2H)-benzofuranone
1,3-indanedione
3-phenyl-2,4-thiazolidinedione
3-ethyl-2-thio-2,4-oxazolidinedione
2-diphenylamino-4(5H)-thiazolone
3-ethyl-1-phenyl-2-thiohydantoin
ethyl cyanoacetate
3-p-carboxyphenylrhodanine
3-methyl-1-p-sulfophenylpyrazolone
3-methyl-1-phenyl-5-pyrazolone
1-ethyloxindole
hippuric acid
3-phenyl-5(4H)-isoxazolone
1,3-diethylbarbituric acid
1,3-diethyl-2-thiobarbituric acid
malonanilide
cyanoacetamide
cyanoacetanilide
benzoylacetonitrile The merocyanine dyes, like the cyanine dyes, may be divided into several subclasses as follows:

Binuclear merocyanines generally represented as

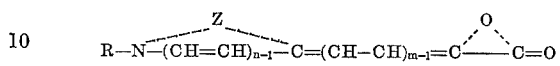

wherein:

R is alkyl or aralkyl, including carboxyalkyl and sulfoalkyl
Z are the nonmetallic atoms necessary to complete a heterocyclic nucleus containing 5 or 6 atoms in the heterocyclic ring, e.g., a nucleus of the benzoxazole series
Q are the nonmetallic atoms necessary to complete a heterocyclic nucleus containing 5 or 6 atoms in the ring
$n$ is 1 or 2
$m$ is 1, 2, 3 or 4;

(2) Complex merocyanines generally represented as

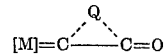

wherein:

Q are the nonmetallic atoms necessary to complete a heterocyclic nucleus containing 5 or 6 atoms in the ring
[M] is the moiety represented as

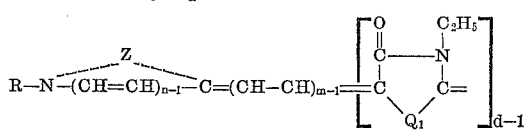

wherein R, Z, $n$ and $m$ are the same as in the binuclear merocyanine formulations; $d$ is 1, 2, 3 or 4 and $Q_1$ is O, Se, S or =N—$R_2$ where $R_2$ is alkyl or aryl;

(3) Quaternized merocyanines generally represented as

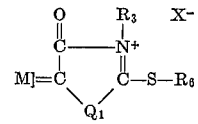

wherein:

[M] and $Q_1$ are the same as in the complex merocyanines
$R_3$ is alkyl, aralkyl or aryl
$R_6$ is alkyl or aralkyl
X is an acid radical;

(4) Quaternary salts derived from merocyanines generally represented as

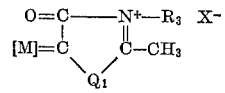

wherein [M], $Q_1$, $R_3$ and X are the same as in the quaternized merocyanines;

(5) Bis-merocyanines derived from quaternary salts of merocyanine generally represented as

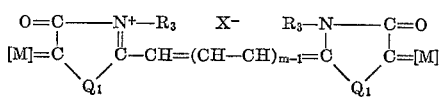

wherein [M], $Q_1$, X and $R_3$ are the same as in the quaternized merocyanines;

(6) Unsymmetrical dyes from quaternary salts of merocyanines generally represented as

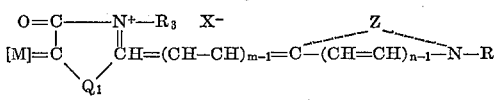

wherein [M], Q, R, $R_3$, X, Z, $m$ and $n$ are the same as in the quaternized merocyanines;

(7) Styryl and butadienyl dyes from quaternary salts of merocyanines generally represented as

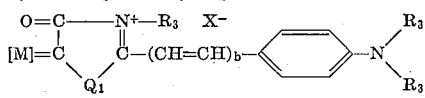

wherein:

[M], $Q_1$, X and $R_3$ are the same as in the quaternized merocyanines
$b$ is 1 or 2;

(8) Pyrrolocyanines from quaternary salts of merocyanines generally represented as

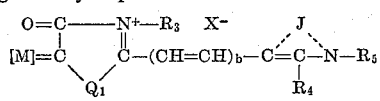

wherein:

[M], $Q_1$, X and $R_3$ are the same as in the quaternized merocyanines
$R_4$ is H, alkyl, or a chemical bond in a pyridine ring
$R_5$ is H, alkyl, aryl, or a chemical bond in the same pyridine ring as $R_4$
J are the nonmetallic atoms necessary to complete a pyrrole nucleus
$b$ is 1 or 2; and (9) Hemicyanines derived from quaternized merocyanines generally represented as

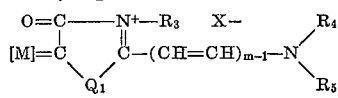

wherein:

[M], $Q_1$, X, and $R_3$ are the same as in the quaternized merocyanines
$m$ is 1, 2, 3 or 4
$R_4$ is alkyl, aralkyl, aryl, or a chemical bond in a saturated heterocyclic ring
$R_5$ is alkyl, aralkyl, aryl, or a chemical bond in the same saturated heterocyclic ring as $R_4$ Finally, the oxonol dyes contain the common chromophore

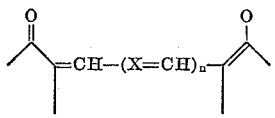

wherein $n$ is 1, 2, 3 or 4. The end nuclei in this class polymethine dyes may be any of those given for the carbonyl half of the merocyanine dyes. As examples of such dyes we may cite

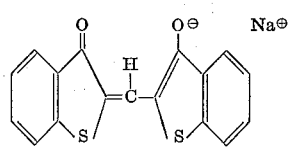

and

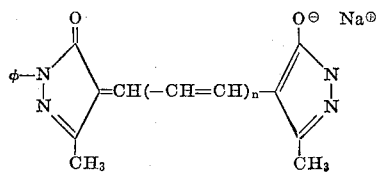

wherein $n$ is 1, 2, 3 or 4.

The final choice among these various dyes will depend upon the background color desired, the rapidity of access needed and the activator used. The proper combination of dye and activator to meet performance requirements for the photosensitive system is well within the ability of one skilled in the art. Although the activators are generally free of halogen atoms they may contain halogens, provided the halogens are not the sole functional group. That is, if halogens are present, there will always be at least one other nonhalogen functional group present in the activator.

Free radical formation by these activators may be by one of several well-known mechanisms which may be summarized as diradical formation

homolytic cleavage

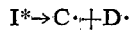

electron transfer

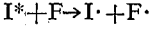

hydrogen transfer

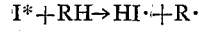

(See for example Photographic Science and Engineering 7: 162 (1963) "Image-Forming Systems Based on Photopolymerization.")

A number of diverse compounds are known in the art which meet the requirements for the activators of this invention and the following list is given as illustrative of a number of different classes; and it is not meant to be limiting.

(1) carbonyl compounds:
  polynuclear quinones
  α-diketones (benzil)
  α-hydroxyketones (benzoin)
  acyloin ethers (benzoin methyl ether)
  α-alkyl substituted aromatic acyloins (α-methyl benzoin);
(2) azo and diazo compounds:
  diazonium chloride of p-aminodiphenylamine
  α-azobis (1-cyclohexanecarbonitrile)
(3) organic sulfur compounds:
  disulfides (dibenzyl disulfide)
  mercaptans (2-mercaptobenzothiazole)
  metal mercaptides (mercuric phenylmercaptide)
  o-alkyl xanthene esters (carbalkoxymethylene bis(n-propyl xanthene)
  thiuram derivatives (tetramethylthiuram disulfide)
  sulfenates (ethyl-2-benzothiazylsulfenate)
(4) peroxides
  di-tertiarybutyl peroxide
  hydrogen peroxides
(5) miscellaneous redox systems
  salts of iron, cobalt and nickel
  β-naphthol
  persulfates
  alkali metal salts of anthraquinone sulfonic acid
  salts of heavy metals including zinc and silver
  divalent tin salts (stannous chloride)
  metal alkyls (tetraethyl lead)
  inorganic sulfides, selenides and tellurides
  uranyl salts of mono- and dicarboxylic acids.

(See for example Jaromir Kosar "Light-Sensitive Systems," John Wiley and Sons, Inc., N.Y., 1965, chapter 5, and U.S. Pats. 2,880,152, 3,065,160 and 3,099,558 for further descriptions of one or more classes of these activators.)

In forming the photosensitive system of this invention, the mole ratio of activator to dye may range from about 20-to-1 to about 500-to-1, with about 100-to-1 being typical and generally preferred. The activator-dye ratio employed will, of course, depend upon the activator-dye system as well as upon the performance characteristics desired from the photosensitive system.

In compounding the photosensitive composition, it may also be desirable to incorporate one or more additives. For example, such additives may include, but are not limited to, plasticizers, agents to control the coating properties, and compounds capable of color filtering. In addition, encapsulated fixing precursors may be included for mechanical release (e.g., application of pressure to break the capsules) after exposure.

The photosensitive system (dye plus activator) is affixed to a substrate through a film-forming binder. This is most conveniently done by forming a solution of the binder along with any additives such as plasticizers, etc., in a suitable solvent and then adding the dye and activator to the solution under conditions of temperature and exposure to light which will not effect any premature bleaching of the dye. The film-forming binder must not, of course, have any adverse effects on the ability of the desired electromagnetic radiation to bleach the dye.

The role of the binder in forming a suitable photosensitive system is not completely understood; but it appears that it is desirable to use a binder having the structure

incorporated therein where X is an electronegative element. Perhaps such binders donate a hydrogen atom, a possibility if the C—H bond is of a type which is relatively easily broken. A suitable binder can be easily chosen as a result of simple experimentation with the desired dye-activator combination. If oxygen enters into the activation process when the photosensitive system is exposed, then it is preferable that the binder be oxygen-permeable.

A number of film-forming resins may be used as the binder; and the preferred one is nitrocellulose applied as a solution in acetone. Other suitable binders include, but are not limited to, ethyl cellulose, Carbowax 6000 (a polyethylene glycol sold by Union Carbide and Carbon Corporation) cellulose acetate butyrate and polyvinyl acetate. Solvents will be chosen which are compatible with these binders, and typical solvents include, but are not limited to, acetone, toluene, methylene chloride, and mixed solvents such as toluene/tetrahydrofuran and benzene/acetone. The performance of the photosensitive system deposited in binders other than nitrocellulose may be enhanced in some systems if a precoat intermediate layer of nitrocellulose is interposed between the substrate and the photosensitive layer. The reason for this enhancement is not understood but may be evidenced by an increase in bleaching speed.

The concentration of the dye and activator in the solution of the film-forming material will be governed by the final coating weight desired and the technique used to apply the coating solution to the substrate surface. The coating weight in turn will generally determine both the image quality and speed of the photosensitive system. In general, the lighter the coating weight the higher will be the resolution and the faster will be the bleaching. The optimum coating weight will also depend upon the extinction coefficient of the photosensitive system and will generally range between about $1 \times 10^{-6}$ to about $1 \times 10^{-4}$ gram dye per square centimeter.

Typically, the concentration of the dye in the coating solution may range from about 0.01 gram to 0.5 gram per 100 milliliters of the solution with about 0.05 gram/100 milliliter being preferable. The amount of activator present will, of course, be governed by the selected mole ratio of activator to dye as defined above.

The thickness of the liquid coating at the time of application to the substrate may vary over a wide range and will be governed by the final coating weight desired, the solids concentration of the coating solution and the method by which the coating is accomplished.

The coating composititon may be applied to the substrate by any suitable, well-known coating technique including roller coating, spraying, brushing, knife coating, and the like. Coating and drying must, of course, be accomplished under conditions which will not cause any premature bleaching of the dye.

The substrate material will, of course, be chosen to give the characteristics desired in the final photograph or photocopy and such materials are well known in the art. Thus, for example, if prints or photocopies are desired, the substrate will be an opaque paper material, typically a photographic print paper. If on the other hand the final product is to be a transparency, then the substrate will be a transparent film, typically of a synthetic resin. The substrate may be flexible or non-flexible as desired, and if a protective or barrier film is interposed between the substrate and the photosensitive film, little attention need be given to the chemical characteristics of the substrate.

The interposition of an intermediate layer between the substrate and the photosensitive film may be desirable for one or more of a number of reasons. This intermediate layer may be a coating of the same film-forming material used for forming the photosensitive layer or it may be formed of any other suitable type of material. It may serve as a barrier to prevent unwanted chemical components of the substrate from making contact with the photosensitive layer. The intermediate layer may also be used to enhance the physical properties of the substrate such as to render it smooth, make it more adhesive to the coating solution, or prevent curl of the substrate. The intermediate layer may also be used to enhance the optical properties of the photosensitive layer. As examples we may cite antihalation layers which are well known in the art and/or a layer of a material capable of absorbing light within a given wavelength range.

FIG. 1 illustrates, in diagrammatic cross section, a photosensitive article constructed in accordance with this invention. Such an article normally takes the form of sheet 10 formed of a substrate 11, an intermediate layer 12, and a photosensitive layer 13. The article of FIG. 1 would be particularly suitable for making black and white or monochrome copies or transparencies, depending on the characteristics of the substrate 11. Thus, if the substrate 11 is an opaque sheet, the final result will be a photocopy or a print, while if the substrate 11 is, for example, a transparent film, the final copy will be a transparency. As explained above, the intermediate layer 12 is optional and may be used to perform one or more of several functions. Similarly, the photosensitive layer 13 may be covered, such as with an anti-abrasion coating 18.

FIG. 2 illustrates the manner in which a photosensitive sheet such as that shown in FIG. 1 may be used to form a copy of a transparency having a light or transparent background 15 and indicia 16. The photosensitive sheet 10 with the photosensitive layer 13 in contact with the transparency 14 is exposed to a suitable light source, in this example a source 17 of ultraviolet light. The ultraviolet light from source 17 will, of course, be transmitted through the light or colorless areas 15 to strike the photosensitive layer 13 and to bleach-out those areas which are thus exposed. However, since the ultraviolet light is not transmitted through the dark or black areas of indicia 16, these areas remain the color of the original dye of the photosensitive system since no bleaching of these areas occurs. The result is the copy illustrated in FIG. 3 wherein the numeral 20 designates the bleached or light areas corresponding to the light areas of the transparency and the dark areas 21 corresponding directly to the indicia on the transparency.

The production of a reverse-reading copy of an opaque master is illustrated in FIGS. 4 and 5. The photosensitive sheet is placed such that the photosensitive layer 13 contacts the opaque master formed of white background areas 23 and dark indicia 24. Exposure to the ultraviolet light 17 will result in its reflection from the white background 23 against the photosensitive layer to produce a bleached area 26 (FIG. 5) and unbleached areas 25. The photosensitive sheet used may have a transparent substrate, in which case the copy of FIG. 5 may be reversed and used as a negative in the manner shown in FIGS. 2 and 3. Thus a right-reading copy may be made as a second step.

Figure 7:
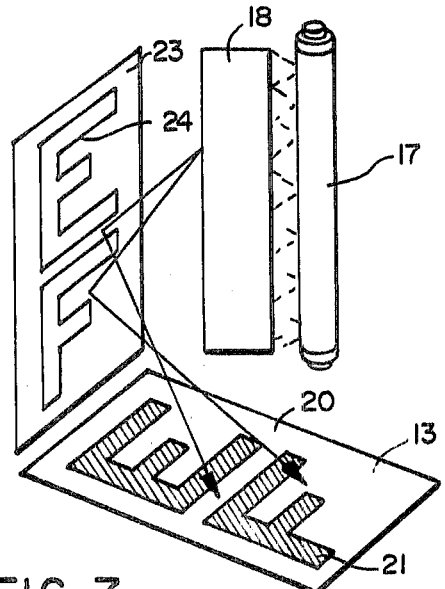
FIG. 7 illustrates the use of the photosensitive article of this invention to make a right-reading copy of an opaque original by the projection technique.

FIGS. 6 and 7 illustrate digrammatically two ways in which right-reading copies may be made directly either by the reflex technique (FIG. 6) or the projection technique (FIG. 7). In FIG. 6 the photosensitive sheet is placed with the substrate surface in contact with the opaque master. Under these circumstances, some definition of outline is lost, but is satisfactory for some purposes. In FIG. 7 the ultraviolet light from source 17 is directed through suitable well-known projection optics indicated generally at 18 to strike the original and to be reflected from the white or light areas 23 onto the photosensitive layer 13. Although this technique is optically feasible it will normally not be employed in photcopying due to the cost of the optical system required in the employment of ultraviolet light. Finally, right-reading copies may be made using optical reversal systems which are known in the photocopy art.

It may be desirable to fix the image after it is formed by exposure of the photosensitive system. Fixing may be accomplished by one of several techniques. If oxygen is involved in the image formation, an anti-oxidant overcoat may be applied to the photosensitive layer. The activator may be quenched by application of a suitable quenching agent, e.g., diphenylamine to quench biacetyl activators. Carbonyl activators may be destroyed by the application of suitable reducing agents. Finally, the activator may be photoreduced such as the photoreduction of aromatic ketones by amines. (See for example JACS 90: 165 (1968).)

If the copy can be stored in a dark environment and exposed only periodically, then fixing is not necessary.

The following examples, which are meant to be illustrative and not limiting, are given further to describe the invention.

EXAMPLE 1

Sufficient acetone was added to a mixture of 10 g. nitrocellulose (Hercules RS5–6 seconds wet with 30% by weight isopropyl alcohol) and 5 g. of dibutylphthalate (plasticizer) to make 100 g. of a standard binder solution. A casein-coated, smooth finish paper was coated with a 2-mil wet thickness film of this standard binder solution and dried. This precoated paper was used in all of the following examples.

To 15 ml. of the above standard binder solution were added 2.5 ml. of methanol, 0.412 g. of benzoin (activator) and 5 ml. of a magenta dye solution (formed by dissolving 0.1 g. of 3,3'-diallylthiacarbocyanine iodide in 50 ml. of methanol). The resulting dye-activator coating solution was applied by means of a doctor knife on the precoated paper substrate to a 6-mil wet thickness. The coating was dried in air to remove the solvents.

The resulting photosensitive sheet was then placed in contact with a black silver transparency as shown in FIG. 2 and exposed for 4 minutes to a General Electric 275-watt RS sunlamp at a distance of 11 inches. The resulting copy was a sharp, high contrast, magenta image on a virtually white background. After one month's storage in the dark the image appeared unchanged.

A print prepared as described was fixed by two five-minute rinses in benzene. When this fixed print was exposed for 10 minutes at 10 inches to a sunlamp the image experienced only slight fading. An unfixed print when exposed in identical manner faded out completely.

EXAMPLE 2

To 10 ml. of the standard binder solution of Example 1 were added 0.614 g. of benzil and 5 ml. of the dye solution of Example 1. After coating and drying as in Example 1, the photosensitive sheet was exposed as in Example 1 for 5 minutes. The resulting copy was essentially identical in appearance and behavior to that formed in Example 1.

EXAMPLE 3

5 ml. of the dye solution of Example 1 was mixed with 10 ml. of the standard binder solution, and to this was added 0.510 g. of 2-t-butylanthraquinone as the activator to form the photosensitive coating which was coated to a 6-mil wet thickness on the precoated paper. After air-drying the photosensitive sheet was exposed for 5 minutes through a 21-step Kodak Photographic step tablet (No. 2 with a density range 0.05 to 3.05) and a glass plate to a General Electric 275-watt RS reflector sunlamp at a distance of 10 inches. In the use of this standard device for measuring photosensitivity the number of steps which have a discernible lower density than the unexposed portion of the photosensitive layer is a measure of its photosensitivity. This means, of course, that the greater the number of steps, the greater is the sensitivity of the system.

The copy resulting from the exposure of the photosensitive system of this example was a high contrast magenta image on a pale yellow background and eight steps were identifiable after exposure. A sheet made up in identical fashion but without the activator and exposed as described gave only four discernible steps.

It should be noted that the film base of the step tablet used had a transmission of about 50% at 360 millimicrons wavelength and considerably less than 50% below 360 millimicrons so that in using the step tablet the radiation to which the photosensitive system was exposed approached the visible spectra range. This means that these systems should be generally much faster when exposed to the optimum radiation wavelength range. However, the step tablet is a standard, reproducible method of evaluating photosensitivity and was therefore used.

EXAMPLE 4

The mole ratio of activator to dye of the system of Example 1 was raised from 100:1 to 500:1 by decreasing the dye concentration by a factor of 5. After a 5-minute exposure as described in Example 3, eight steps were distinguishable and the image was pink on a white background.

EXAMPLE 5

To 5 ml. of a dye solution (0.089 g. 3,3'-diethyloxacarbocyanine iodide in 50 ml. methanol) were added 0.408 g. of benzoin, 2.5 ml. methanol and 15 ml. of the standard binder solution. This was coated at 6-mil wet thickness on the precoated paper and when air-dried the photosensitive sheet was exposed as in Example 3. The yellow coating bleached to a pale yellow orange to give 3 distinguishable steps. In the absence of the benzoin activator no bleaching occurred.

EXAMPLE 6

A photosensitive coating solution was made up as in Example 5, except that the quantity of dye was halved. Exposure of the resulting photosensitive sheet to a 275-watt reflector sunlamp through a silver transparency at a distance of 6 inches for 40 seconds produced a sharp print having a yellow image on a white background.

EXAMPLE 7

The dye solution of Example 5 was replaced by one made by dissolving 0.10 g. 3,3'-diethylthiadicarbocyanine iodide in 50 ml. of methanol. Eight steps were bleached from a bright blue to a pale medium blue.

EXAMPLE 8

The dye solution of Example 5 was replaced by one made by dissolving 0.074 g. 2-(p-dimethylaminostyryl)-1-ethylpyridinium iodide in 50 ml. of methanol. Five steps were bleached from orange to very pale orange. A control containing no benzoin activator did not experience any bleaching under identical conditions.

EXAMPLE 9

Photosensitive sheets were prepared as in Example 1. Four of these were exposed to a 500-watt photoflood lamp through a glass plate, step tablet and Wratten filters. The filters were blue, green and red. Sheets were also made up as in Example 1 with coatings which were identical except that they contained no benzoin activator and these were exposed as described. The results obtained, in terms of distinguishable steps formed, were as follows

|  | Filter | | | |
| --- | --- | --- | --- | --- |
|  | Clear | No. 47 blue | No. 58 green | No. 25A red |
| Benzoin | 9 | 0 | 5 | 1 |
| No benzoin | 3 | 0 | 0 | 0 |

These data illustrate that these photosensitive systems may be chosen to be color sensitive, thus presenting the capability of being formed into multilayer color-sensitive systems.

Figure 8:
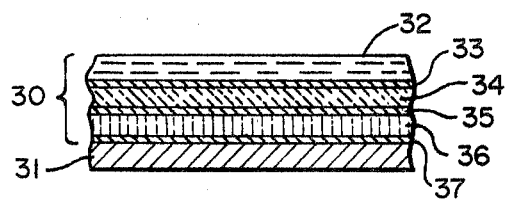
FIG. 8 illustrates in cross section one embodiment of a film suitable for producing full-color prints or transparencies in accordance with this invention.

FIG. 8 illustrates diagrammatically one structural embodiment of a photosensitive film suitable for making color copies as prints or transparencies. The photosensitive layer assembly 30 is affixed to an opaque or transparent substrate 31. The photosensitive layer assembly comprises, from top down, a photosensitive layer 32 having a yellow dye which is bleached by blue light in the presence of a suitable activator; a barrier layer 33; a photosensitive layer 34 having a magenta dye which is bleached by green light in the presence of an activator; a barrier layer 35; a photosensitive layer 36 having a cyan dye which is bleached by red light in the presence of an activator; and an antihalation layer 37. One or more of the barrier layers and/or the antihalation layer may be omitted, depending upon the characters of the dyes and activators, e.g., whether they interact or migrate from layer to layer, etc. The three activators may be the same or different for the three dyes. The bleaching rate in each layer must be essentially the same for the same intensity of light. It is also essential that the bleaching of each layer is caused only by the proper wavelengths, e.g., the cyan layer by red light. Thus, the activators cannot be allowed to migrate from one layer to another. The barrier layers 33 and 35 are provided to prevent such migration. As an alternative to the use of such barrier layers, the activators may be of a nondiffusing type such as those having a polymeric structure or a long hydrocarbon "tail" containing at least 18 to 20 carbon atoms. Finally, systems may be chosen such that each activator is specific only to its associated dye, having no effect on the other two dyes. In this event, layers 32, 34 and 36 may be a single layer and the barrier layers 33 and 35 may be omitted.

There are, of course, many polymethine dyes which may be used to provide the required yellow, magenta and cyan layers. As examples of yellow dyes we may cite 2-p-dimethylaminostyryl-1-ethyl pyridinium iodide, 3,3'-diethyloxacarbocyanine iodide and 3,3'-diethyl-4'-methoxacarbocyanine iodide; as magenta dyes 3,3'-diallylthiacarbocyanine iodide, 3,3'-diethylthiacarbocyanine iodide, p-dimethylaminostyryl-$\beta$-naphtho thiazole methyl iodide and 1,3'-diethyloxa-2'-carbocyanine paratoluene sulfonate; and as cyan dyes 3,3'-diethylthiacarbocyanine iodide, 1,3'-diethylthia-4-carbocyanine iodide and 1,1'-dimethyl-2,2'-dicarbocyanine paratoluenesulfonate.

The barrier layers may be of any suitable material which does not interfere with the transmission of radiation, e.g., a thin film of nitrocellulose. Antihalation layers are well known in the art. See for example "Photographic Chemistry" by Pierre Glafkides, Fountain Press, London, 1958, volume 1, page 470 et seq.

Figure 9:
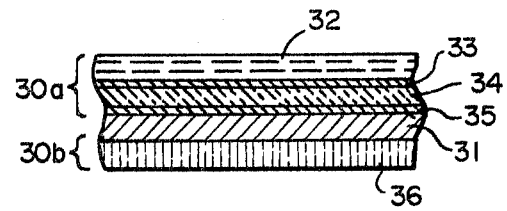
FIG. 9 illustrates in cross section another embodiment of film for full color.

FIG. 9 illustrates another structural embodiment of a photosensitive film in which like numbers refer to like elements in FIG. 8. In the structure of FIG. 9 the photosensitive layer assembly consists of two sections—section 30a adhered to one surface of the substrate 31 and section 30b adhered to the other surface of the substrate. This arrangement is, of course, only suitable if substrate 31 is a transparent film. It has, however, the advantage of offering the possibility of eliminating one barrier or antihalation layer 38. It also offers more flexibility in fixing processes, allowing different forms of fixing techniques to be applied to the two separated sections 30a and 30b. The actual arrangement of dyes and activators is also flexible and need not be that shown in FIG. 9.

Figure 10:
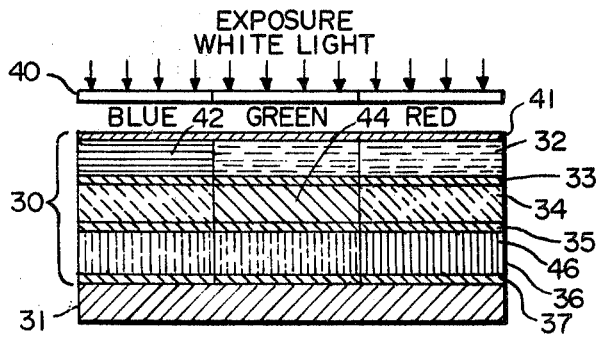
FIG. 10 illustrates diagrammatically the result of exposing the film of FIG. 8 to white light through a transparency which is red, green, and blue.

FIG. 10 illustrates the manner in which the photosensitive layer assembly of the film functions when exposed to blue, green and red light generated by a suitable transparency 40. The film of FIG. 10 has an additional top layer 41, the function of which is to absorb ultraviolet radiation. It may or may not be strippable and is optional, its use being dependent upon whether or not it is necessary to present unwanted dye bleaching by ultraviolet light.

Figure 11:
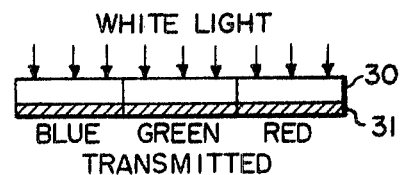
FIG. 11 illustrates diagrammatically the effect of projecting white light through the exposed and fixed film of FIG. 10.

Turning to FIG. 10 it will be seen that the area 42 exposed to blue light absorbs blue and is bleached; the area 44 absorbs green and is bleached; and the area 46 absorbs red and is bleached. Since the system is a subtractive color system, when white light is passed through the exposed film, the area corresponding to area 42 (FIG. 11) will transmit blue, that corresponding to area 44 will transmit green and that corresponding to area 46 will transmit red.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawings shall be interpreted as illustrative and not in a limiting sense.

We claim:

1. A photosensitive composition which bleaches to form an image upon exposure to electromagnetic radiation, consisting essentially of a polymethine dye and an activator which is essentially colorless in a binder; said activator being a compound capable of forming free radicals when exposed to a predetermined wavelength range of electromagnetic radiation in the presence of said dye, free of any functional —$CX_3$ groupings in which X is a halogen, capable of initiating photopolymerization of vinyl monomers and being a carbonyl, azo, diazo, organic sulfur-containing or peroxide compound; said binder having the structure

incorporated therein where X' is an electronegative group.

2. A photosensitive composition in accordance with claim 1 wherein said polymethine dye is a cyanine dye.

3. A photosensitive composition in accordance with claim 1 wherein said polymethine dye is a merocyanine dye.

4. A photosensitive composition in accordance with claim 1 wherein said polymethine dye is a styryl dye.

5. A photosensitive composition in accordance with claim 1 wherein said polymethine dye is an oxonol dye.

6. A photosensitive composition in accordance with claim 1 wherein said activator is a carbonyl compound which is an $\alpha$-diketone or an $\alpha$-hydroxyketone.

7. A photosensitive composition in accordance with claim 1 which is activated by ultraviolet radiation.

8. A photosensitive composition in accordance with claim 1 which is activated by visible light.

9. A photosensitive composition in accordance with claim 1 wherein the mole ratio of activator to dye ranges between about 20-to-1 to about 500-to-1.

10. A photosensitive composition in accordance with claim 1 wherein said binder is nitrocellulose.

11. A photosensitive composition in accordance with claim 1 wherein said binder is ethyl cellulose.

12. A photosensitive composition in accordance with claim 1 wherein said binder is cellulose acetate butyrate.

13. A photosensitive composition in accordance with claim 1 including an additive which is a radiation filtering material or an encapsulated reducing agent.

14. A photosensitive article suitable for exposure to radiant energy for forming an image by direct bleach-out, consisting essentially of
(a) a substrate; and
(b) at least one layer of a photosensitive composition affixed to said substrate in a binder having the structure

incorporated therein where X' is an electronegative group, said photosensitive composition consisting essentially of
(1) a polymethine dye, and
(2) an activator which is essentially colorless, capable of forming free radicals when exposed to a predetermined wavelength range of electromagnetic radiation in the presence of said dye, being free of any functional —$CX_3$ groupings which X is a halogen and being a carbonyl, azo, diazo, organic sulfur-containing or peroxide compound.

15. A photosensitive article in accordance with claim 14 further characterized by having an intermediate coating layer interposed between said substrate and said layer of said photosensitive composition.

16. A photosensitive article in accordance with claim 14 characterized by having a plurality of photosensitive layers each of which comprises a photosensitive composition being sensitive to light of a wavelength different from the wavelength to which any other of said compositions is sensitive, whereby said article is capable of forming multicolored images upon exposure.

17. A photosensitive article in accordance with claim 16 wherein said layers are separated by layers of non-photosensitive material.

18. A photosensitive article in accordance with claim 16 wherein at least one of said plurality of photosensitive layers is on one surface of said substrate while the remaining of said layers are on the other surface of said substrate.

19. A method of forming an image of a master by direct bleach-out, characterized by exposing a photosensitive system in association with said master to electromagnetic radiation of a predetermined wavelength range, said photosensitive system consisting essentially of a polymethine dye and an activator incorporated in a binder and being affixed to a substrate, said activator being capable of forming free radicals when exposed to said wavelength range, free of any functional —$CX_3$ groupings in which X is a halogen and being a carbonyl, azo, diazo, organic sulfur-containing, or peroxide compound; said binder having the structure

incorporated therein where X' is an electronegative group.

20. A method in accordance with claim 19 wherein said activator is a carbonyl compound and said image is fixed by the step of destroying said activator by applying to said image a reducing agent for said carbonyl compound.

References Cited

UNITED STATES PATENTS

| | | | |
|---|---|---|---|
| 1,850,220 | 2/1932 | Wendt et al. | 96—89 |
| 3,099,558 | 7/1963 | Levinos | 96—35.1 |
| 3,154,416 | 10/1964 | Fidelman | 96—89X |
| 3,218,167 | 11/1965 | Burg et al. | 96—35.1X |
| 3,305,361 | 2/1967 | Gaynor et al. | 96—89X |
| 3,418,118 | 12/1968 | Thommes et al. | 96—35.1X |

FOREIGN PATENTS

| | | | |
|---|---|---|---|
| 723,123 | 12/1965 | Canada | 96—89 |

J. TRAVIS BROWN, Primary Examiner

J. WINKELMAN, Assistant Examiner

U.S. CL. X.R.

96—73, 89